Nov. 10, 1964  L. H. ROSENHAFT  3,156,163
TWIN CHAMBER MOTOR ASSEMBLY
Filed March 18, 1963
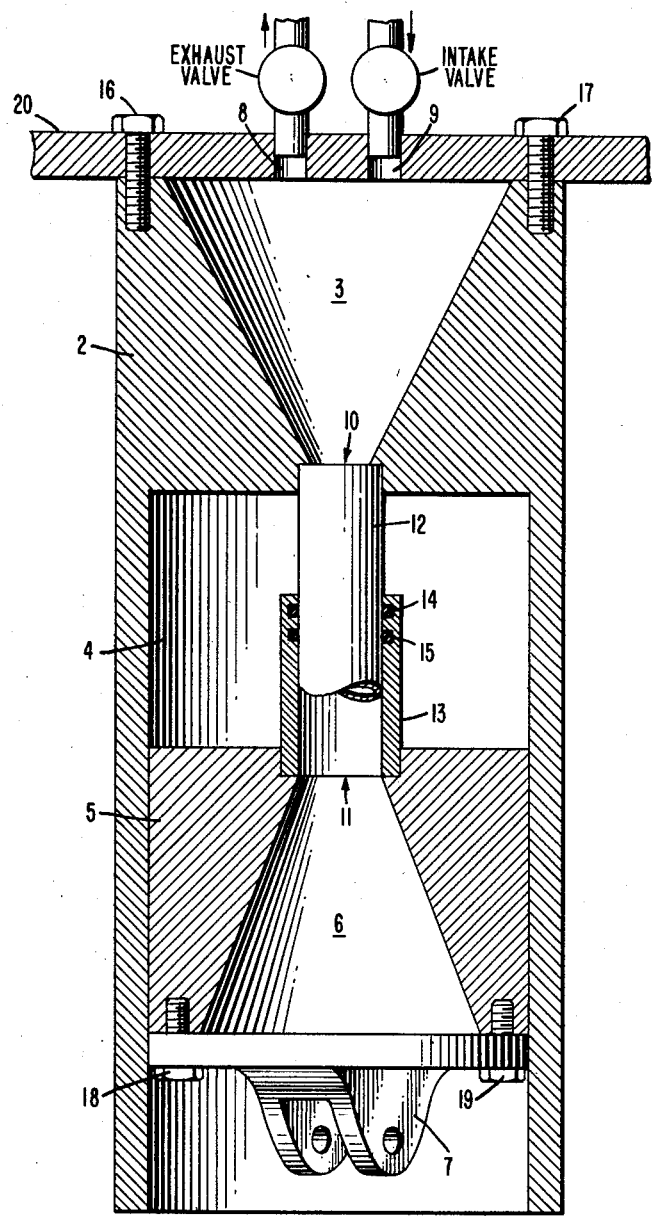
INVENTOR
Leonel H. Rosenhaft 3,156,163
TWIN CHAMBER MOTOR ASSEMBLY
Lionel H. Rosenhaft, New York, N.Y.
(1053 E. 55th St, Brooklyn 34, N.Y.)
Filed Mar. 18, 1963, Ser. No. 265,933
2 Claims. (Cl. 92—113)

This invention relates to an improvement in a piston type motor assembly and has for a general object the use of less liquid or air under pressure per cycle on motors of this type, by means of using twin compression chambers coupled with a tube or tubes, sealed against leakage, and acting in a telescopic manner as the movable linkage between both compression chambers.

Another object of this invention is to avoid the need of pressure sealing between the piston and the piston wall.

Another object of this invention is the simplicity of the component parts and assembly to achieve the results.

Still another object of this invention is to obtain the same power stroke from each piston with the use of less liquid or air under pressure and thus adding to the r.p.m. speed.

I have invented such a motor assembly which I call the twin chamber motor assembly. This motor assembly uses only three componant parts, consisting of a top compression chamber, a piston with a built-in compression chamber and a means of tubes, suitably protected against leakage as a movable linkage between both compression chambers.

This motor assembly makes use of "Pascal's Laws" in that pressure applied to a closed container full of liquid or air will have equal pressure exerted on all sides and where that pressure is exerted to a stationary object against a movable object, the movable object is forced to move away from the stationary object. When pressure fills the upper compression chamber and through the movable linkage into the piston compression chamber, any added pressure will force the piston away from the upper compression chamber as the upper compression chamber is the immovable object. An assembled unit of this invention roughly resembles an hour glass shape internally and is within a cylinder housing, this hour glass shape or as if two funnels were connected to each other by their narrow ends seem to have given the best results under various tests, but other shapes and forms, using this method, may be used.

This invention also comprises details of construction and combination of parts, which will fully appear in coarse of description and drawings and will illustrate and describe how any one skilled in the art may reproduce the same and get the same results; however the drawings show only one way of using this motor assembly when it is apparent to anyone skilled in the art that a multitude of variations are possible. To detail these variations such as the shape of piston compression chambers or of the upper compression chamber, or the means of coupling them together, or the use of a single tube instead of nested tubes as shown in the drawing, will serve no purpose but to confuse. These drawings clearly show this invention.

It is also apparent that this motor assembly may be used with a vehicle other than liquids such as air, gas, vapor or another substance or vehicle or mixture, so I do not limit myself to the use of liquids to obtain the desired results of this invention and I only use liquid for an illustration and I therefore reserve all of the rights that are within the limit and scope of this invention.

I therefore make full disclosure of this invention and hope and pray that Letters Patent be issued to me on this "Twin Chamber Motor Assembly."

The attached drawing shows a cross sectional view of an assembled unit consisting of the cylinder #2 with a built-in compression chamber #3 in the upper section and a piston area #4 in the lower section, also the piston #5 with a built-in compression chamber #6 and a means for attaching a piston rod #7, also the telescopic nested tubes #12 and #13 which are the movable linkage between the upper cylinder compression chamber and the piston compression chamber, #9 is the intake port, #8 is the exhaust port, both parts entering into top of the cylinder compression chamber. #10 is the cylinder compression chamber port connecting to #12 tube, with sealing means against leakage #14 and #15 and sliding within tube #13, tube #13 connecting into port #11 of piston compression chamber #6, said nested tubes #12 and #13 being the movable connecting link between #3 cylinder compression chamber and #6 piston compression chamber for the interchange of liquid between #3 and #6 chambers. #5 piston having a built-in compression chamber #6; and a means of attaching a piston rod #7. #16 and #17 bolts that hold cylinder #2 to top plate #20, #18 and #19 bolts that hold #7 piston rod holder and is base for #6 piston compression chamber. The operation of this "Twin Chamber Motor Assembly." Looking at the drawing, you will note that means of applying and relieving pressures are not shown as this is not part of my invention and may be of any suitable type. Bearing this in mind the "Twin Chamber Motor Assembly," operates thusly:

9, the intake port is opened to receive liquid under pressure and #8 exhaust port is closed. Liquid under pressure is now flowing into cylinder compression chamber #3 and into and through linkage tubes #12 and #13 and thence to the piston compression chamber #6. As the liquid fills in the pressure will be at the opposing ends of cylinder compression chamber #3 and piston compression chamber #6, forcing the two chambers apart and expanding the linkage tubes #12 and #13 to the full extent permitted by the limiting piston rod attached to #7. When this is fully extended the length of piston stroke has been reached, the #9 intake port is then closed and the #8 exhaust port opened. The liquid is then exhausted until the top of the piston stroke is reached. This completes a cycle.

In all subsequent cycles the liquid that always remains in compression chambers #3 and #6 and partly within the leakage tubes #12 and #13 which precludes the necessity of a complete refill but each subsequent cycle only requires the filling to capacity of the small amount of liquid necessary to fully extend the linkage tubes #12 and #13, to their full capacity allowed them by the limited travel distance of the piston by the piston rod. Replacement of that amount of liquid on the next cycle will refill said linkage tubes and force the compression chambers #3 and #6 apart, thus starting another cycle.

Having full disclosed my invention, I claim the following as new and useful:

1. In a piston type hydraulic motor, in combination, a cylinder having a built-in compression chamber in the upper section, a piston area in the lower section, said cylinder compression chamber having ports on the top for the intake and exhaust of fluid pressures, a port at the bottom of said cylinder compression chamber, having a tube extending downward therefrom into the piston area, said tube for the interchange of fluid pressures between the above said cylinder compression chamber and the piston, said piston having a built-in compression chamber, with a port on top, a tube extending therefrom upwardly, said tube nesting with the tube from the cylinder compression chamber, both said tubes having in common suitable seals against leakage of fuel pressure, said tubes telescope and are movable, said piston with compression chamber having on the underside a means for attaching a piston rod, said cylinder compression chamber, piston with a compression chamber and the tubes are interconnected and all housed within the cylinder.

2. In a piston type hydraulic motor, in combination, a separate compression chamber built into the upper cylinder section, said compression chamber having an inverted conical shape with the base on top, having ports on said top for the intake and exhaust of fuel pressures, a port on the apex facing downward, with a tube extending therefrom nesting with a tube extending upward from a piston with a built-in compression chamber, said piston compression chamber having a conical shape with the apex on top terminating in a port with a tube, both said tubes nesting into each other and suitably sealed against fluid pressure leakage, said piston with compression chamber having at its base a means for attaching a piston rod, said cylinder compression chamber, said piston with a built-in compression chamber and nested tubes are all housed within the same cylinder.

References Cited by the Examiner
UNITED STATES PATENTS

| | | | |
|---|---|---|---|
| 2,918,337 | 12/59 | Kapitula | 309—4 |
| 2,993,472 | 7/61 | Einsiedler | 91—117 |
| 3,003,469 | 10/61 | Kelsey | 91—113 |

FOREIGN PATENTS

| | | |
|---|---|---|
| 509,123 | 7/39 | Great Britain. |
| 523,137 | 7/40 | Great Britain. |

FRED E. ENGELTHALER, *Primary Examiner.*

RICHARD WILKINSON, SAMUEL LEVINE,
*Examiners.*